(12) United States Patent
Ni

(10) Patent No.: US 7,692,655 B2
(45) Date of Patent: Apr. 6, 2010

(54) APPARATUS AND METHOD OF GENERATING CURVED BASELINE FOR MAP LABELING

(75) Inventor: Hongjie Ni, Torrance, CA (US)

(73) Assignee: MiTAC International Corporation, Taoyuan (TW)

( * ) Notice: Subject to any disclaimer, the term of this patent is extended or adjusted under 35 U.S.C. 154(b) by 344 days.

(21) Appl. No.: 11/675,817

(22) Filed: Feb. 16, 2007

(65) Prior Publication Data

US 2008/0198162 A1 Aug. 21, 2008

(51) Int. Cl.
*G06T 15/40* (2006.01)
(52) U.S. Cl. ......................... 345/442; 701/23
(58) Field of Classification Search ................. 345/441, 345/442; 701/200–226, 23
See application file for complete search history.

(56) References Cited

U.S. PATENT DOCUMENTS

| | | | |
|---|---|---|---|
| 5,515,283 A | 5/1996 | Desai et al. | |
| 5,724,072 A * | 3/1998 | Freeman et al. | 345/648 |
| 5,802,492 A | 9/1998 | DeLorme et al. | |
| 5,926,118 A | 7/1999 | Hayashida et al. | |
| 5,988,853 A | 11/1999 | Kim et al. | |
| 6,078,864 A | 6/2000 | Long et al. | |
| 6,081,609 A | 6/2000 | Narioka | |
| 6,084,989 A | 7/2000 | Eppler | |
| 6,092,076 A | 7/2000 | McDonough et al. | |
| 6,107,944 A | 8/2000 | Behr et al. | |
| 6,108,603 A | 8/2000 | Karunanidhi | |
| 6,108,604 A | 8/2000 | Fakaga et al. | |
| 6,115,669 A | 9/2000 | Watanabe et al. | |
| 6,124,826 A | 9/2000 | Garthwaite et al. | |
| 6,125,326 A | 9/2000 | Ohmura et al. | |
| 6,141,621 A | 10/2000 | Piwowarski et al. | |
| 6,148,261 A | 11/2000 | Obradovich et al. | |
| 6,151,552 A | 11/2000 | Koizumi et al. | |
| 6,154,699 A | 11/2000 | Williams | |
| 6,163,269 A | 12/2000 | Millington et al. | |
| 6,172,641 B1 | 1/2001 | Millington | |
| 6,175,801 B1 | 1/2001 | Millington | |
| 6,177,943 B1 | 1/2001 | Margolin | |
| 6,178,380 B1 | 1/2001 | Millington | |
| 6,184,823 B1 | 2/2001 | Smith et al. | |
| 6,189,130 B1 | 2/2001 | Gofman et al. | |
| 6,201,540 B1 | 3/2001 | Gallup et al. | |
| 6,204,778 B1 | 3/2001 | Bergan et al. | |
| 6,205,397 B1 | 3/2001 | Eslambolchi et al. | |
| 6,212,474 B1 | 4/2001 | Fowler et al. | |
| 6,223,118 B1 | 4/2001 | Kobayashi et al. | |

(Continued)

FOREIGN PATENT DOCUMENTS

JP 2001194172 7/2001

(Continued)

OTHER PUBLICATIONS

International Patent Application PCT/US08/75839, International Search Report and Written Opinion (mailed Mar. 19, 2009).

(Continued)

*Primary Examiner*—Michelle K Lay
(74) *Attorney, Agent, or Firm*—Greenberg Traurig, LLP

(57) ABSTRACT

Apparatus and methods of generating a curved baseline for a map labeling include receiving a polyline $P=\{p_1, p_2, \ldots, p_n\}$ of n points, generating a supporting polyline $Q=\{q_1, q_2, \ldots, q_m\}$ ($m \geq n$) of m points at an expected distance d between polyline P and a curved base line L. A predetermined number of B-Spline points is generated based upon supporting polyline Q. The B-Spline points are then connected to form a curved baseline L for displaying a label.

12 Claims, 11 Drawing Sheets

U.S. PATENT DOCUMENTS

| | | |
|---|---|---|
| 6,229,546 B1 | 5/2001 | Lancaster et al. |
| 6,249,740 B1 | 6/2001 | Ito et al. |
| 6,253,151 B1 | 6/2001 | Ohler et al. |
| 6,256,029 B1 | 7/2001 | Millington |
| 6,278,942 B1 | 8/2001 | McDonough |
| 6,308,134 B1 | 10/2001 | Croyle et al. |
| 6,320,517 B1 | 11/2001 | Yano et al. |
| 6,321,158 B1 | 11/2001 | DeLorme et al. |
| 6,349,257 B1 | 2/2002 | Liu et al. |
| 6,356,210 B1 | 3/2002 | Ellis |
| 6,360,167 B1 | 3/2002 | Millington et al. |
| 6,362,751 B1 | 3/2002 | Upparapalli |
| 6,363,322 B1 | 3/2002 | Millington |
| 6,370,475 B1 | 4/2002 | Breed et al. |
| 6,377,278 B1 | 4/2002 | Cutright et al. |
| 6,381,536 B1 | 4/2002 | Satoh et al. |
| 6,385,535 B2 | 5/2002 | Ohishi et al. |
| 6,385,542 B1 | 5/2002 | Millington |
| 6,397,145 B1 | 5/2002 | Millington |
| 6,405,130 B1 | 6/2002 | Piwowarski |
| 6,408,243 B1 | 6/2002 | Yofu |
| 6,427,115 B1 | 7/2002 | Sekiyama |
| 6,430,501 B1 | 8/2002 | Slominski |
| 6,453,235 B1 | 9/2002 | Endo et al. |
| 6,484,089 B1 | 11/2002 | Millington |
| 6,487,494 B2 | 11/2002 | Odinak et al. |
| 6,515,595 B1 | 2/2003 | Obradovich et al. |
| 6,529,822 B1 | 3/2003 | Millington et al. |
| 6,529,824 B1 | 3/2003 | Obradovich et al. |
| 6,539,301 B1 | 3/2003 | Shirk |
| 6,542,814 B2 | 4/2003 | Polidi et al. |
| 6,565,610 B1 | 5/2003 | Wang et al. |
| 6,574,551 B1 | 6/2003 | Maxwell et al. |
| 6,609,062 B2 | 8/2003 | Hancock |
| 6,631,322 B1 | 10/2003 | Arthur et al. |
| 6,662,105 B1 | 12/2003 | Tada et al. |
| 6,671,617 B2 | 12/2003 | Odinak et al. |
| 6,704,649 B2 | 3/2004 | Miyahara |
| 6,728,608 B2 | 4/2004 | Ollis et al. |
| 6,728,636 B2 | 4/2004 | Kokijima et al. |
| 6,748,323 B2 | 6/2004 | Lokshin et al. |
| 6,765,554 B2 | 7/2004 | Millington |
| 6,774,932 B1 | 8/2004 | Ewing |
| 6,782,319 B1 | 8/2004 | McDonough |
| 6,816,596 B1 | 11/2004 | Peinado et al. |
| 6,819,301 B2 | 11/2004 | Nagamatsu et al. |
| 6,842,695 B1 | 1/2005 | Tu |
| 6,873,907 B1 | 3/2005 | Millington et al. |
| 6,885,874 B2 | 4/2005 | Grube et al. |
| 6,917,982 B1 | 7/2005 | Dueck et al. |
| 6,938,028 B1 | 8/2005 | Ito et al. |
| 7,031,834 B2 | 4/2006 | Ito et al. |
| 7,031,836 B2 | 4/2006 | Branch |
| 7,058,504 B2 | 6/2006 | McDonough et al. |
| 7,170,518 B1 | 1/2007 | Millington et al. |
| 7,233,860 B2 | 6/2007 | Lokshin et al. |
| 7,260,475 B2 | 8/2007 | Suzuki |
| 7,321,826 B2 | 1/2008 | Sheha et al. |
| 7,333,820 B2 | 2/2008 | Sheha et al. |
| 7,343,242 B2 | 3/2008 | Breitenberger et al. |
| 7,353,107 B2 | 4/2008 | Breitenberger et al. |
| 7,379,812 B2 | 5/2008 | Yoshioka et al. |
| 7,421,334 B2 | 9/2008 | Dahlgren |
| 7,512,487 B1 | 3/2009 | Golding et al. |
| 7,546,202 B2 | 6/2009 | Oh |
| 7,590,490 B2 | 9/2009 | Clark |
| 2001/0018628 A1 | 8/2001 | Jenkins et al. |
| 2002/0151315 A1 | 10/2002 | Hendrey |
| 2003/0036842 A1 | 2/2003 | Hancock |
| 2003/0036848 A1 | 2/2003 | Sheha et al. |
| 2003/0167120 A1 | 9/2003 | Kawasaki |
| 2003/0182052 A1 | 9/2003 | DeLorme et al. |
| 2003/0191578 A1 | 10/2003 | Paulauskas et al. |
| 2004/0049337 A1 | 3/2004 | Knockeart et al. |
| 2005/0107948 A1 | 5/2005 | Catalinotto |
| 2006/0058949 A1 * | 3/2006 | Fogel et al. ............... 701/208 |
| 2006/0080031 A1 | 4/2006 | Cooper et al. |
| 2006/0089788 A1 | 4/2006 | Laverty |
| 2006/0106534 A1 | 5/2006 | Kawamata et al. |
| 2006/0212217 A1 | 9/2006 | Sheha et al. |
| 2006/0265422 A1 | 11/2006 | Ando et al. |
| 2007/0027628 A1 | 2/2007 | Geelen |
| 2007/0073480 A1 | 3/2007 | Singh |
| 2007/0088494 A1 | 4/2007 | Rothman et al. |
| 2007/0130153 A1 | 6/2007 | Nachman et al. |
| 2007/0204218 A1 | 8/2007 | Weber et al. |
| 2007/0213929 A1 | 9/2007 | Tanizaki et al. |
| 2007/0233384 A1 | 10/2007 | Lee et al. |
| 2008/0076451 A1 | 3/2008 | Sheha et al. |
| 2008/0125958 A1 | 5/2008 | Boss et al. |
| 2008/0133120 A1 | 6/2008 | Romanick |
| 2008/0134088 A1 | 6/2008 | Tse et al. |
| 2008/0177470 A1 | 7/2008 | Sutardja |
| 2008/0270016 A1 | 10/2008 | Proietty et al. |
| 2009/0138190 A1 | 5/2009 | Kulik |
| 2009/0150064 A1 | 6/2009 | Geelen |
| 2009/0171584 A1 | 7/2009 | Liu |
| 2009/0182498 A1 | 7/2009 | Seymour |
| 2009/0182500 A1 | 7/2009 | Dicke |
| 2009/0187340 A1 | 7/2009 | Vavrus |
| 2009/0187341 A1 | 7/2009 | Vavrus |
| 2009/0187342 A1 | 7/2009 | Vavrus |

FOREIGN PATENT DOCUMENTS

| | | |
|---|---|---|
| JP | 2002048574 | 2/2002 |
| JP | 2006250875 | 9/2006 |
| JP | 2007155582 | 6/2007 |
| JP | 2007178182 | 7/2007 |
| JP | 2008002978 | 1/2008 |
| KR | 19990011004 | 2/1999 |
| KR | 19990040849 | 6/1999 |
| KR | 20020084716 | 11/2002 |
| KR | 20040106688 | 12/2004 |
| KR | 20070080726 | 8/2007 |
| WO | WO 2007129710 | 11/2007 |

OTHER PUBLICATIONS

Auto Nav 2000 Plus, Inc., "750NAV™ & 750M™ Features & Benefits," located at http://www.autonav2000.com/features.htm, 2000.

Bernston, G., "Mobitex—A New Network for Mobile Data Communications," Ericsoon Review, vol. 66, No. 1, Jan. 1989, Stockholm, SE, pp. 33-39.

Atlas Cartographic technologies Ltd., "reLive! User Manual," located at http://relive.abmaps.com/map/ , 2006.

Dingus, T.A., "Human Factors Engineering The Travtek Driver Interface," Proceedings of the Vehicle Navigation and Information Systems Conference, vol. 2, Oct. 20, 1991, pp. 749-755.

First Conference Ltd., "Navigation & Location 2007," conference schedule, located at http://www.telematicsupdate.com/navUSA2007/agenda.shtml , Dec. 2007.

Guzolek, John et al., "Real-Time Route Planning in Road Networks," Vehicle Navigation and Information Systems Conference, Sep. 11-13, 1989, pp. 165-169.

International Patent Application PCT/US00/00072, International Search Report (mailed Aug. 18, 2000).

International Patent Application PCT/US00/41590, International Search Report (mailed May 14, 2001).

International Patent Application PCT/US00/41590, Written Opinion.

International Patent Application PCT/US01/32531, International Search Report (mailed Jul. 7, 2002).

International Patent Application PCT/US01/41889, International Search Report (mailed Apr. 8, 2002).

International Patent Application PCT/US03/23777, International Search Report (mailed Dec. 10, 2003).

International Patent Application PCT/US07/76733, International Search Report and Written Report (mailed Aug. 20, 2008).
International Patent Application PCT/US00/41590, International Search Report (mailed May 14, 2001).
International Patent Application PCT/US08/50650, International Search Report and Written Opinion (mailed May 13, 2008).
International Patent Application PCT/US08/50759, International Search Report and Written Opinion (mailed May 9, 2008).
International Patent Application PCT/US08/50760, International Search Report and Written Opinion (mailed May 13, 2008).
International Patent Application PCT/US08/50764, International Search Report and Written Opinion (mailed Sep. 29, 2008).
International Patent Application PCT/US08/51019, International Search Report and Written Opinion (mailed Jun. 26, 2008).
International Patent Application PCT/US08/77389, International Search Report and Written Opinion (mailed Mar. 31, 2009).
International Patent Application PCT/US96/20852, International Search Report and Written Opinion (mailed Jun. 13, 1997 and Sep. 1, 1997 respectively).
International Patent Application PCT/US97/16552, International Search Report (mailed Jan. 9, 1998).
International Patent Application PCT/US99/03870, International Search Report (mailed Jul. 28, 1999).
International Patent Application PCT/US99/07911, International Search Report (mailed Jul. 30, 1999).
International Patent Application PCT/US99/08459, International Search Report (mailed Sep. 3, 1999).
International Patent Application PCT/US99/08462, International Search Report (mailed Sep. 17, 1999).
International Patent Application PCT/US99/08589, International Search Report (mailed Sep. 7, 1999).
International Patent Application PCT/US99/08776, International Search Report (mailed Sep. 15, 1999).
International Patent Application PCT/US99/08776, Written Opinion (mailed Feb. 10, 2000).
International Patent Application PCT/US99/09779, International Search Report (mailed Oct. 12, 1999).
International Patent Application PCT/US99/12575, International Search Report (mailed Sep. 29, 1999).
International Patent Application PCT/US99/12575, Written Opinion (mailed Apr. 2000).
Jagadeesh, G. et al., "Heuristic Techniques for Accelerating Hierarchical Routing on Road Networks," IEEE Transactions on Intelligent Transportation Systems, IEEE Service Center, vol. 3, No. 4, Dec. 2002, p. 307.
Magellan Navigation, Inc., "Magellan Maestro™ 4000 User Manual," 2007.
Magellan, "1997 Magellan Products Anywhere to Anywhere Satellite Navigation and Communication," 1997, pp. 1-20.
Magellan, Magellan PathMaster Turn-by-Turn Route Guidance & Driver Information System, pp. 1-4.
Martin, Scott, "Connected GPS Unit Roadmap—The Next Generation," GPSLodge, located at http://www.gpslodge.com/archives/015915.php, Jan. 6, 2006.
NAVTEQ, "NAVTEQ Announces European Winners of Global LBS Challenge™, Drives Location and Navigation on Wireless Devices," located at http://www.navteq.com/webapps/NewsUserServlet?action+NewsDetail&newsId=500, Feb. 13, 2007.
Privat, Ludovic, "uLocate Acquires Web Start-Up Zynce," GPS Business News, located at http://www.gpsbusinessnews.com/index.php?action=article&numero=649&TOKEN_RETURN, Feb. 13, 2008.
Sloane, Julie, "Top 10 Startups Worth Watching in 2008," Wired Magazine, located at http://www.wired.com/print/techbiz/startups/news/2007/12/YE_10_startups, Dec. 24, 2007.
Tellmewhere.com, company information located at http://www.tellmewhere.com, 2007.
Thales Navigation, "Mobile Mapper," User Manual, Jul. 2003, pp. 1-120.
Tilefile Ltd., company information located at http://www.tilefile.com/tour/, 2007.
uLocate Communications, Inc., "Zync," product information located at http://www.zync.com/, 2008.

Alexander Wolff, Lars Knipping, Marc van Kreveld, Tycho Strijk and Pankaj K. Agawal, 2002 "A simple and Efficient Algorithm for High Quality Line Labeling".
PCT/US08/50650—International Search Report (mailed May 13, 2008).
PCT/US08/50650—Written Opinion (mailed May 13, 2008).
International Patent Application Serial No. PCT/US2009/030176, Written Opinion and International Search Report, mailed Sep. 1, 2009.
USPTO Tranaction History of related U.S. Appl. No. 08/691,663, filed Aug. 2, 1996, entitled "Method Providing A Textual Description of a Remote Vehicle Location," now U.S. Patent No. 6,141,621.
USPTO Transaction History of related U.S. Appl. No. 08/691,727, filed Aug. 2, 1996, entitled "System and Method for Controlling a Vehicle Emergency Respinse Network," now U.S. Patent No. 6,539,301.
USPTO Transaction History of related U.S. Appl. No. 08/710,473, filed Sep. 18, 1996, entitled "Navigation Simulator and Recorder," now U.S. Patent No. 5,922,041.
USPTO Transaction History of related U.S. Appl. No. 08/713,625, filed Sep. 13, 1996, entitled "Navigation System With Vehicle Service Information," now U.S. Patent No. 5,819,201.
USPTO Transaction History of related U.S. Appl. No. 08/713,627, filed Sep. 13, 1996, entitled "Navigation System With User Definable Cost Values," now U.S. Patent No. 5,878,368.
USPTO Transaction History of related U.S. Appl. No. 08/762,012, filed Dec. 11, 1996, entitled "Navigation System With Forward Looking Origin Selection For Route Re-Calculation," now U.S. Patent No. 6,405,130.
USPTO Transaction History of related U.S. Appl. No. 09/037,772, filed Mar. 10, 1998, entitled "Navigation System Character Input Device," now U.S. Patent No. 6,037,942.
USPTO Transaction History of related U.S. Appl. No. 09/056,218, filed Apr. 7, 1998, entitled "Navigation System using Position Network for Map Matching," now U.S. Patent No. 6,108,603.
USPTO Transaction History of related U.S. Appl. No. 09/062,518, filed Apr. 17, 1998, entitled "3-Dimensional Intersection Display for Vehicle Navigation System," now U.S. Patent No. 6,611,753.
USPTO Transaction History of related U.S. Appl. No. 09/096,103, filed Jun. 11, 1998, entitled "Navigation System With A Route Exclusion List System," now U.S. Patent No. 6,362,751.
USPTO Transaction History of related U.S. Appl. No. 09/099,963, filed Jun. 19, 1998, entitled "Autoscaling of Recommended Route," now U.S. Patent No. 6,574,551.
USPTO Transaction History of related U.S. Appl. No. 09/100,683, filed Jun. 19, 1998, entitled "Navigation System Map Panning Directional Indicator," now U.S. Patent No. 6,175,801.
USPTO Transaction History of related U.S. Appl. No. 09/114,670, filed Jul. 13, 1998, entitled "Navigation System Vehicle Location Display," now U.S. Patent No. 6,049,755.
USPTO Transaction History of related U.S. Appl. No. 09/118,030, filed Jul. 17, 1998, entitled "Navigation System With Predetermined Indication of Next Maneuver," now U.S. Patent No. 6,078,684.
USPTO Transaction History of related U.S. Appl. No. 09/160,068, filed Sep. 24, 1998, entitled "Navigation System With Anti-Alias Map Display," now U.S. Patent No. 6,163,269.
USPTO Transaction History of related U.S. Appl. No. 09/176,630, filed Oct. 22, 1998, entitled "Street Identification for a Map Zoom of a Navigation System," now U.S. Patent No. 6,178,380.
USPTO Transaction History of related U.S. Appl. No. 09/239,692, filed Jan. 29, 1999, entitled "Vehicle Navigation System With Location Based Multi-Media Annotation," now U.S. Patent No. 6,360,167.
USPTO Transaction History of related U.S. Appl. No. 09/418,749, filed Oct. 15, 1999, entitled "Navigation System With Road Condition Sampling," now U.S. Appl. No. 6,484,089.
USPTO Transaction History of related U.S. Appl. No. 09/435,381, filed Nov. 5, 1999, entitled "Navigation System Character Input Device," now U.S. Patent No. 6,765,554.
USPTO Transaction History of related U.S. Appl. No. 09/470,438, filed Dec. 22, 1999, entitled "Navigation System With All Character Support," now U.S. Patent No. 6,256,029.

USPTO Transaction History of related U.S. Appl. No. 09/470,441, filed Dec. 22, 1999, entitled "Navigation System With Unique Audio Tones for Maneuver Notification," now U.S. Patent No. 6,363,322.
USPTO Transaction History of related U.S. Appl. No. 09/487,654, filed Jan. 19, 2000, entitled "Navigation System With Route Indicators," now U.S. Patent No. 6,430,501.
USPTO Transaction History of related U.S. Appl. No. 09/519,143, filed Mar. 6, 2000, entitled "Navigation System With Complex Maneuver Instruction," now U.S. Patent No. 6,397,145.
USPTO Transaction History of related U.S. Appl. No. 09/535,733, filed Mar. 27, 2000, entitled "Selective Rendering of Cartographic Entities for Navigation System," now U.S. Patent No. 7,170,518.
USPTO Transaction History of related U.S. Appl. No. 09/547,004, filed Apr. 11, 2000, entitled "Navigation System With Zoomed Maneuver Instruction," now U.S. Patent No. 6,529,822.
USPTO Transaction History of related U.S. Appl. No. 09/661,982, filed Sep. 18, 2000, entitled "Points of Interest for Navigation System," now U.S. Patent No. 6,374,180.
USPTO Transaction History of related U.S. Appl. No. 09/679,671, filed Oct. 5, 2000, entitled "Navigation System With Run-Time Training Instruction," now abandoned.
USPTO Transaction History of related U.S. Appl. No. 09/691,531, filed Oct. 18, 2000, entitled "Multiple Configurations For a Vehicle Navigation System," now U.S. Patent No. 6,385,542.
USPTO Transaction History of related U.S. Appl. No. 09/799,876, filed Mar. 6, 2001, entitled "Navigation System With Figure of Merit Determination," now U.S. Patent No. 6,741,928.
USPTO Transaction History of related U.S. Appl. No. 10/088,017, filed Sep. 9, 2002, entitled "Navigation System With User Interface," now U.S. Patent No. 6,873,907.
USPTO Transaction History of related U.S. Appl. No. 10/208,261, filed Jul. 31, 2002, entitled "Displaying Data," now U.S. Patent No. 6,748,323.
USPTO Transaction History of related U.S. Appl. No. 10/619,619, filed Jul. 16, 2003, entitled "Intelligent Modular Navigation Information Capability," now U.S. Patent No. 7,233,860.
USPTO Transaction History of related U.S. Appl. No. 11/327,450, filed Jan. 9, 2006, entitled "Smart Detour."
USPTO Transaction History of related U.S. Appl. No. 11/518,205, filed Sep. 11, 2006, entitled "Method and System of Securing Content and Destination of Digital Download Via the Internet."
USPTO Transaction History of related U.S. Appl. No. 11/684,301, filed Mar. 9, 2007, entitled "Method and Apparatus For Determining a Route Having an Estimated Minimum Fuel Usage for a Vehicle."
USPTO Transaction History of related U.S. Appl. No. 11/737,125, filed Apr. 18, 2007, entitled "Method and System Navigation Using GPS Velocity Vector."
USPTO Transaction History of related U.S. Appl. No. 11/740,280, filed Apr. 25, 2007, entitled "Adjusting Spatial Operations Based on Map Density."
USPTO Transaction History of related U.S. Appl. No. 11/840,610, filed Aug. 17, 2007, entitled "Methods and Apparatus for Measuring the Effectiveness of Advertisements Presented on a Mobile Navigation Device."
USPTO Transaction History of related U.S. Appl. No. 11/844,321, filed Aug. 23, 2007, entitled "Rerouting in Vehicle Navigation Systems."
USPTO Transaction History of related U.S. Appl. No. 11/852,973, filed Sep. 10, 2007, entitled "Nearest Neighbor Geographic Search."
USPTO Transaction History of related U.S. Appl. No. 11/906,277, filed Oct. 1, 2007, entitled "Static and Dynamic Contours."
USPTO Transaction History of related U.S. Appl. No. 11/945,211, filed Nov. 26, 2007, entitled "System and Method of Providing Traffic Data to a Mobile Device."
USPTO Transaction History of related U.S. Appl. No. 11/967,889, filed Jan. 1, 2008, entitled "System and Method for Accessing a Navigation System."
USPTO Transaction History of related U.S. Appl. No. 12/013,384, filed Jan. 11, 2008, entitled "System and Method to Provide Navigational Assistance Using an Online Social Network."
USPTO Transaction History of related U.S. Appl. No. 12/016,949, filed Jan. 18, 2008, entitled " Method and Apparatus for Hybrid Routing Using Breadcrumb Paths."
USPTO Transaction History of related U.S. Appl. No. 12/016,980, filed Jan. 18, 2008, entitled "Method and Apparatus to Search for Local Parking."
USPTO Transaction History of related U.S. Appl. No. 12/016,982, filed Jan. 18, 2008, entitled "Method and Apparatus for Access Point Recording Using a Position Device."
USPTO Transaction History of related U.S. Appl. No. 12/188,139, filed Aug. 7, 2008, entitled "System and Method to Record a Present Trip."
USPTO Transaction History of related U.S. Appl. No. 12/192,018, filed Aug. 14, 2008, entitled "Route Navigation via a Proximity Point."
International Patent Application No. PCT/US2008/084659, Written Opinion and International Search Report, Apr. 28, 2009.
International Patent Application No. PCT/US2009/030177, Written Opinion and International Search Report, Apr. 29, 2009.
International Patent Application No. PCT/US2009/030314, Written Opinion and International Search Report, May 25, 2009.
Shamir, Adi et al., "Playing 'Hide and Seek' with Stored Keys," Lecture Notes in Computer Science, vol. 1648, 1991, pp. 118-124.
Transaction History of related U.S. Appl. No. 08/691,663, filed Aug. 2, 1996, entitled "Method Providing A Textual Description of a Remote Vehicle Location," now U.S. Patent No. 6,141,621.
Transaction History of related U.S. Appl. No. 08/691,727, filed Aug. 2, 1996, entitled "System and Method for Controlling a Vehicle Emergency Response Network," now U.S. Patent No. 6,539,301.
Transaction History of related U.S. Appl. No. 08/710,473, filed Sep. 18, 1996, entitled "Navigation Simulator and Recorder," now U.S. Patent No. 5,922,041.
Transaction History of related U.S. Appl. No. Appl. No. 08/713,625, filed Sep. 13, 1996, entitled "Navigation System With Vehicle Service Information," now U.S. Patent No. 5,819,201.
Transaction History of related U.S. Appl. No. 08/713,627, filed Sep. 13, 1996, entitled "Navigation System With User Definable Cost Values," now U.S. Patent No. 5,878,368.
Transaction History of related U.S. Appl. No. 08/762,012, filed Dec. 11, 1996, entitled "Navigation System With Forward Lookin Origin Selection For Route Re-Calculation," now U.S. Patent No. 6,405,130.
Transaction History of related U.S. Appl. No. 09/037,772, filed Mar. 10, 1998, entitled "Navigation System Character Input Device," now U.S. Appl. No. 6,037,942.
Transaction History of related U.S. Appl. No. 09/056,218, filed Apr. 7, 1998, entitled "Navigation System using Position Network for Map Matching," now U.S. Patent No. 6,108,603.
Transaction History of related U.S. Appl. No. 09/062,518, filed Apr. 17, 1998, entitled "3-Dimensional Intersection Display for Vehicle Navigation System," now U.S. Patent No. 6,611,753.
Transaction History of related U.S. Appl. No. 09/096,103, filed Jun. 11, 1998, entitled "Navigation System With A Route Exclusion List System," now U.S. Patent No. 6,362,751.
Transaction History of related U.S. Appl. No. 09/099,963, filed Jun. 19, 1998, entitled "Autoscaling of Recommended Route," now U.S. Patent No. 6,574,551.
Transaction History of related U.S. Appl. No. 09/100,683, filed Jun. 19, 1998, entitled "Navigation System Map Panning Directional Indicator," now U.S. Patent No. 6,175,801.
Transaction History of related U.S. Appl. No. 09/114,670, filed Jul. 13, 1998, entitled "Navigation System Vehicle Location Display," now U.S. Patent No. 6,049,755.
Transaction History of related U.S. Appl. No. 09/118,030, filed Jul. 17, 1998, entitled "Navigation System With Predetermined Indication of Next Maneuver," now U.S. Patent No. 6,078,684.
Transaction History of related U.S. Appl. No. 09/160,068, filed Sep. 24, 1998, entitled "Navigation System With Anti-Alias Map Display," now U.S. Patent No. 6,163,269.
Transaction History of related U.S. Appl. No. 09/176,630, filed Oct. 22, 1998, entitled "Street Identification for a Map Zoom of a Navigation System," now U.S. Patent No. 6,178,380.
Transaction History of related U.S. Appl. No. 09/239,692, filed Jan. 29, 1999, entitled "Vehicle Navigation System With Location Based Multi-Media Annotation," now U.S. Patent No. 6,360,167.

Transaction History of related U.S. Appl. No. 09/418,749, filed Oct. 15, 1999, entitled "Navigation System With Road Condition Sampling," now U.S. Patent No. 6,484,089.

Transaction History of related U.S. Appl. No. 09/435,381, filed Nov. 5, 1999, entitled "Navigation System Character Input Device," now U.S. Patent No. 6,765,554.

Transaction History of related U.S. Appl. No. 09/470,438, filed Dec. 22, 1999, entitled "Navigation System With All Character Support," now U.S. Patent No. 6,256,029.

Transaction History of related U.S. Appl. No. 09/470,441, filed Dec. 22, 1999, entitled "Navigation System With Unique Audio Tones for Maneuver Notification," now U.S. Patent No. 6,363,322.

Transaction History of related U.S. Appl. No. 09/487,654, filed Jan. 19, 2000, entitled "Navigation System With Route Indicators," now U.S. Patent No. 6,430,501.

Transaction History of related U.S. Appl. No. 09/519,143, filed Mar. 6, 2000, entitled "Navigation System With Complex Manuever Instruction," now U.S. Patent No. 6,397,145.

Transaction History of related U.S. Appl. No. 09/535,733, filed Mar. 27, 2000, entitled "Selective Rendering of Cartographic Entities for Navigation System," now U.S. Patent No. 7,170,518.

Transaction History of related U.S. Appl. No. 09/547,004, filed Apr. 11, 2000, entitled "Navigation System With Zoomed Maneuver Instruction," now U.S. Patent No. 6,529,822.

Transaction History of related U.S. Appl. No. 09/661,982, filed Sep. 18, 2000, entitled "Points of Interest for Navigation System," now U.S. Patent No. 6,374,180.

Transaction History of related U.S. Appl. No. 09/679,671, filed Oct. 5, 2000, entitled "Navigation System With Run-Time Training Instruction," now abandoned.

Transaction History of related U.S. Appl. No. 09/691,531, filed Oct. 18, 2000, entitled "Multiple Configurations For a Vehicle Navigation System," now U.S. Patent No. 6,385,542.

Transaction History of related U.S. Appl. No. 09/799,876, filed Mar. 6, 2001, entitled "Navigation System With Figure of Merit Determination," now U.S. Patent No. 6,741,928.

Transaction History of related U.S. Appl. No. 10/088,017, filed Sep. 9, 2002, entitled "Navigation System With User Interface," now U.S. Patent No. 6,873,907.

Transaction History of related U.S. Appl. No. 10/208,261, filed Jul. 31, 2002, entitled "Displaying Data," now U.S. Patent No. 6,748,323.

Transaction History of related U.S. Appl. No. 10/619,619, filed Jul. 16, 2003, entitled "Intelligent Modular Navigation Information Capability," now U.S. Patent No. 7,233,860.

Transaction History of related U.S. Appl. No. 11/327,450, filed Jan. 9, 2006, entitled "Smart Detour."

Transaction History of related U.S. Appl. No. 11/518,205, filed Sep. 11, 2006, entitled "Method and System of Securing Content and Destination of Digital Download Via the Internet."

Transaction History of related U.S. Appl. No. 11/684,301, filed Mar. 9, 2007, entitled "Method and Apparatus For Determining a Route Having an Estimated Minimum Fuel Usage for a Vehicle."

Transaction History of related U.S. Appl. No. 11/737,125, filed Apr. 18, 2007, entitled "Method and System Navigation Using GPS Velocity Vector."

Transaction History of related U.S. Appl. No. 11/740,280, filed Apr. 25, 2007, entitled "Adjusting Spatial Operations Based on Map Density."

Transaction History of related U.S. Appl. No. 11/840,610, filed Aug. 17, 2007, entitled "Methods and Apparatus for Measuring the Effectiveness of Advertisements Presented on a Mobile Navigation Device."

Transaction History of related U.S. Appl. No. 11/844,321, filed Aug. 23, 2007, entitled "Rerouting in Vehicle Navigation Systems."

Transaction History of related U.S. Appl. No. 11/852,973, filed Sep. 10, 2007, entitled "Nearest Neighbor Geographic Search."

Transaction History of related U.S. Appl. No. 11/906,277, filed Oct. 1, 2007, entitled "Static and Dynamic Contours."

Transaction History of related U.S. Appl. No. 11/945,211, filed Nov. 26, 2007, entitled "System and Method of Providing Traffic Data to a Mobile Device."

Transaction History of related U.S. Appl. No. 11/967,889, filed Jan. 1, 2008, entitled "System and Method for Accessing a Navigation System."

Transaction History of related U.S. Appl. No. 12/013,384, filed Jan. 11, 2008, entitled "System and Method to Provide Navigational Assistance Using an Online Social Network."

Transaction History of related U.S. Appl. No. 12/016,949, filed Jan. 18, 2008, entitled "Method and Apparatus for Hybrid Routing Using Breadcrumb Paths."

Transaction History of related U.S. Appl. No. 12/016,980, filed Jan. 18, 2008, entitled "Method and Apparatus to Search for Local Parking."

Transaction History of related U.S. Appl. No. 12/016,982, filed Jan. 18, 2008, entitled "Method and Apparatus for Access Point Recording Using a Position Device.".

Transaction History of related U.S. Appl. No. 12/188,139, filed Aug. 7, 2008, entitled "System and Method to Record a Present Trip."

Transaction History of related U.S. Appl. No. 12/192,018, filed Aug. 14, 2008, entitled "Route Navigation via a Proximity Point."

Transaction History of related U.S. Appl. No. 12/195,152, filed Aug. 20, 2008, entitled "Systems and Methods for Smart City Search."

USPTO Transaction History of related U.S. Appl. No. 12/195,152, filed Aug. 20, 2008, entitled "Systems and Methods for Smart City Search."

International Application No. PCT/US09/30322, International Search Report and Written Opinion, Aug. 31, 2009.

* cited by examiner

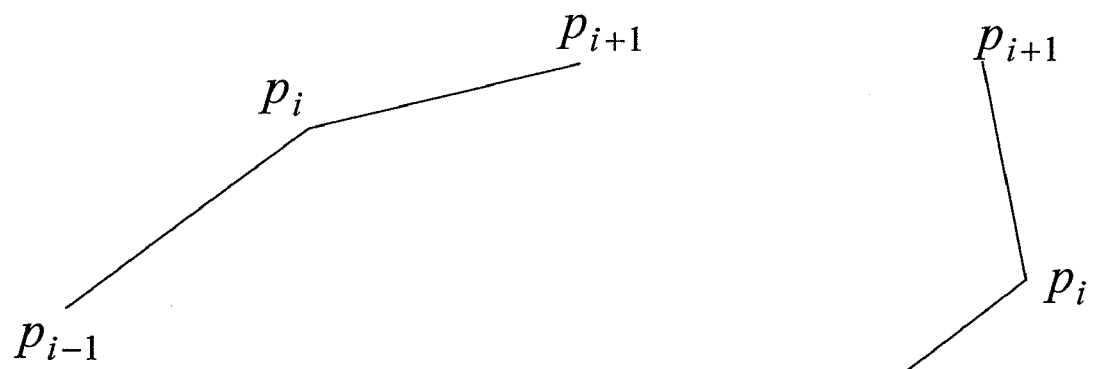
Fig. 5
Fig. 6
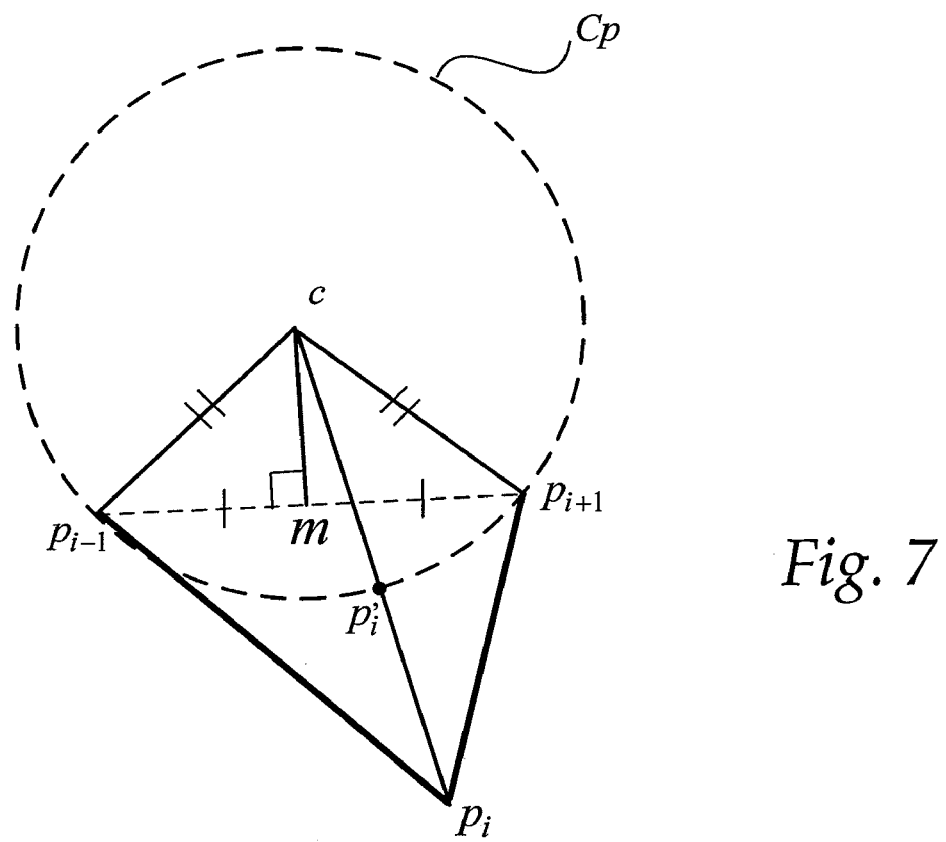
Fig. 7

APPARATUS AND METHOD OF GENERATING CURVED BASELINE FOR MAP LABELING

FIELD OF THE INVENTION

The present invention relates generally to apparatus and methods for displaying maps, and more specifically, to apparatus and methods that generate curved labeling on portable GPS (Global Positioning System) devices.

BACKGROUND OF THE INVENTION

Global positioning systems allow automatic route calculation from a current position to a destination location. Such systems guide a driver of a vehicle along a calculated trip route from the particular instantaneous vehicle location to the destination location by outputting trip instructions in conjunction with a visual display of route segments as the vehicle progresses.

One exemplary geographical position location system receives and analyzes location parameters derived from the Global Positioning System (GPS), a radio-navigation system, developed and operated by the U.S. Defense Department, which includes a series of 24 constellation satellites orbiting the earth at a distance of approximately 20,000 kilometers. The GPS position location parameters permit wireless device processors to determine their respective three dimensional positions and velocities using very precise location parameters and timing signals received from the satellites.

The displays on many portable GPS devices are small and the data populating the screen must be efficiently presented. Care must be taken to prevent overcrowding the screen with too much data. Furthermore, text labels accompanying objects should be accurately positioned so as to best associate the text with the object, i.e. road, river, etc., with minimal crossovers and crowding.

Accordingly, the interest and the demand of finding efficient map labeling methods is increasing. Most discussions of map labeling are concentrating on straight line, horizontal or slant, based labeling. However, not all roads and rivers are straight objects wherein their accompanying text may be drawn on a baseline calculated using a linear equation of the form y=mx+b. Curved labeling may deliver better results for labeling map polylines such as rivers and roads because it can be more faithful to the original polylines.

Alexander Wolff provides in reference [1] a method of curved labeling by generating circular arcs. The method executes in $O(n^2)$ time, where n is the number of points of the polyline.

However, the number of points of polylines can be very large and the computation burden of generating curved labels may compromise the map drawing performance of a handheld or vehicle navigation GPS device.

Accordingly there is a need for apparatus and methods that efficiently generate curved labels for maps drawn on portable GPS devices.

[1] Alexander Wolff, Lars Knipping, Marc van Kreveld, Tycho Strijk and Pankaj K. Agarwal, 2002, A Simple and Efficient Algorithm for High-quality Line Labeling. http://i11www.iti.uni-karlsruhe.de/map-labeling/papers/wkksa-seahq-00.pdf

SUMMARY OF THE INVENTION

The present invention provided an efficient method and apparatus for calculating a curved baseline for display text on an end user's portable map displaying device, and in particular, on a portable global positioning system (GPS) device, that may for instance, be handheld by a user and/or mounted in a vehicle.

Under control of processor within the portable end user device, position information retrieved from the GPS network, and map data that, in at least one embodiment, is stored in the end user device, a display of the current location of the device is displayed. Map information includes for example, a representation of objects such as roads, which are formed by polylines. In many cases, the polylines are best annotated with a curved label for visual clarity.

According to one aspect, a portable GPS device is configured to perform the actions performed on the end user device as disclosed above. Such a device may include a computer platform further including a memory that comprises a map display module that further includes a curved baseline generator module. The curved baseline generator module comprises an input of a polyline P of n points, where $P=\{p_1, p_2, \ldots, p_n\}$ and logic operable to generate a supporting polyline Q of m points at an expected distance d between P and a curved base line L, where $Q=\{q_1, q_2, \ldots, q_m\}$ ($m \geq n$). The curved baseline generator module further includes logic operable to generate a predetermined number of B-Spline points based upon the generated supporting polyline Q. An output of the curved baseline generator module comprises the B-Spline points, which is connected to form curved baseline L for displaying a label.

In a second aspect, a method to generate curved labels for maps drawn on portable GPS devices includes receiving a polyline P of n points, where $P=\{p_1, p_2, \ldots, p_n\}$ and generating a supporting polyline Q of m points an expected distance d between P and a to be determined curved base line L, where $Q=\{q_1, q_2, \ldots, q_m\}$ ($m \geq n$). Based upon the supporting polyline Q, a predetermined number of B-Spline points are generated and outputted.

A third aspect of the method includes connecting the generated B-Spline points to form the curved baseline L for displaying a label.

A fourth further aspect includes a computer-readable medium embodying logic to perform the steps described in the second and third aspects described above.

Another aspect includes a processor capable of executing the logic stored in the computer-readable medium of the fourth aspect.

BRIEF DESCRIPTION OF THE DRAWINGS

The present apparatus and methods are illustrated by way of example, and not by limitation, in the figures of the accompanying drawings, wherein elements having the same reference numeral designations represent like elements throughout and wherein:

FIG. 5 is a geometric drawing of a right-turning point of a polyline P;

FIG. 6 is a geometric drawing of a left-turning point of a polyline P;

FIG. 7 is a geometric drawing illustrating the generation of a point $p'_i$ from a left-turning point $p_i$ wherein the angle $\angle p_{i-1}p_ip_{i+1}$ is less than 135 degrees, according to FIG. 1;

DETAILED DESCRIPTION OF THE EXEMPLARY EMBODIMENTS

Figure 1:
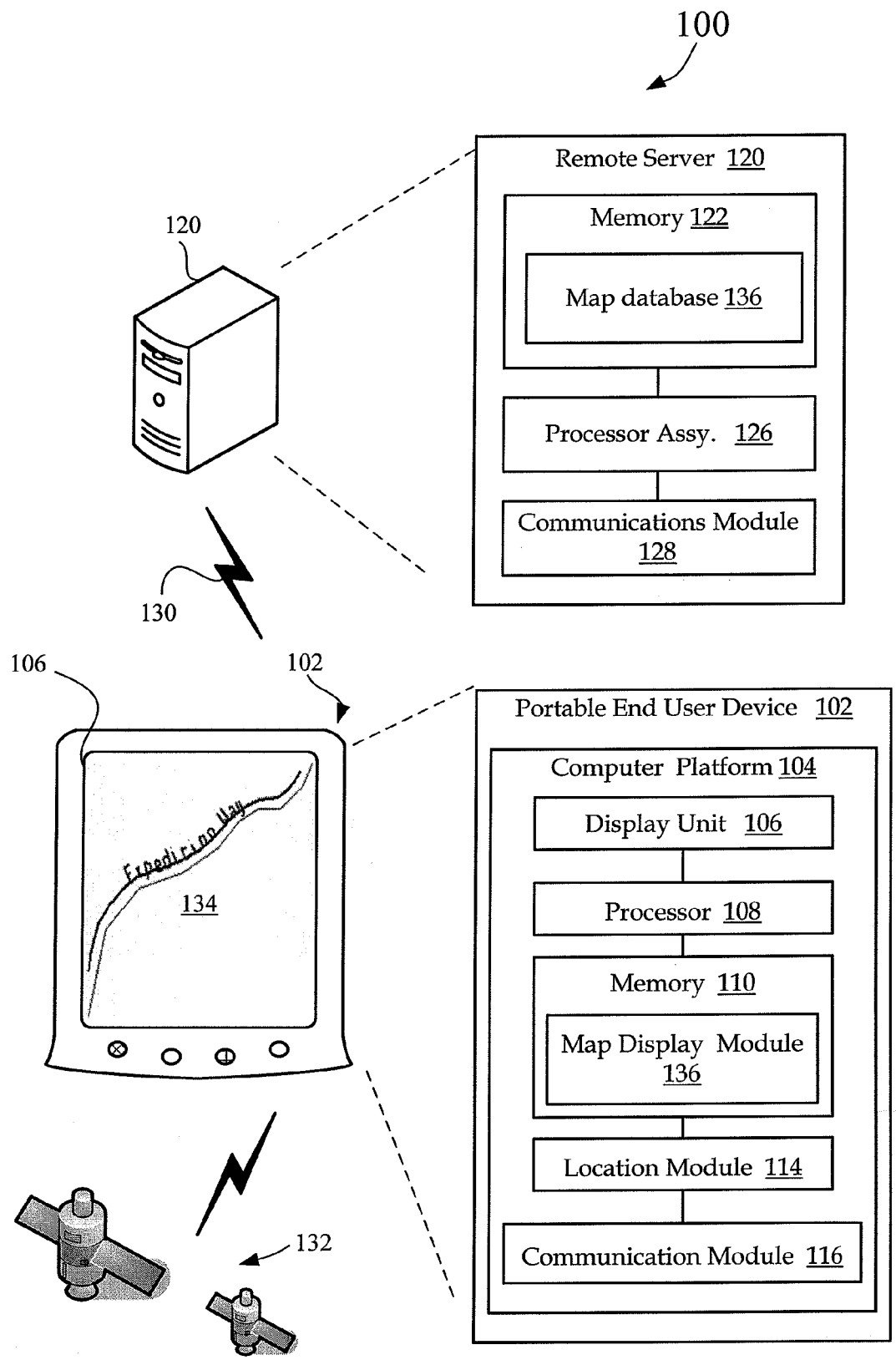
FIG. 1 is a system diagram of a GPS navigation system that includes a portable end user device capable of drawing labels on a curved baseline according to the present invention.

FIG. 1 is an illustration of a navigation system 100 for determining the position of a portable user device 102. The system 100 may also provide the capability of guiding a user in navigating the user to a predetermined location.

In one exemplary embodiment, the system 100 determines the position of a portable user device 102 using location parameters derived from, a radio-navigation system, such as the Global Positioning System (GPS), developed and operated by the U.S. Defense Department. In some embodiments, the GPS navigation system 100 receives data from several satellites 132 orbiting the earth at a distance of approximately 20,000 kilometers. The GPS position location parameters permit a user device 102, in communication with the satellites, to determine their respective three dimensional positions and velocities using very precise location parameters and timing signals received from the satellites 132.

The user device 102 includes an integrated/external display unit, i.e., display screen 106, on which a map 134, or portion thereof, is displayed. In some embodiments the map 134 includes curved objects, e.g., roads, rivers, topographical boundaries, etc., which, for the sake of visual clarity, a curved baseline is best suited for displaying text related to the curved object.

In some embodiments, map data is stored on the user device 102. In other embodiments, a particular map 134, or map object, e.g., points of interest along a predetermined may be downloaded from another computer, i.e., remote server 120, over a communication network 130.

Non-limiting, the remote server 120 includes a memory 122 including maps and map related information stored in a map database 136. The remote server 120 includes a communication module 128 that under control of a processor assembly 126, receives a request for information from, and transmits the requested data to, the end user device 102 over a communications network 130.

Figure 2:
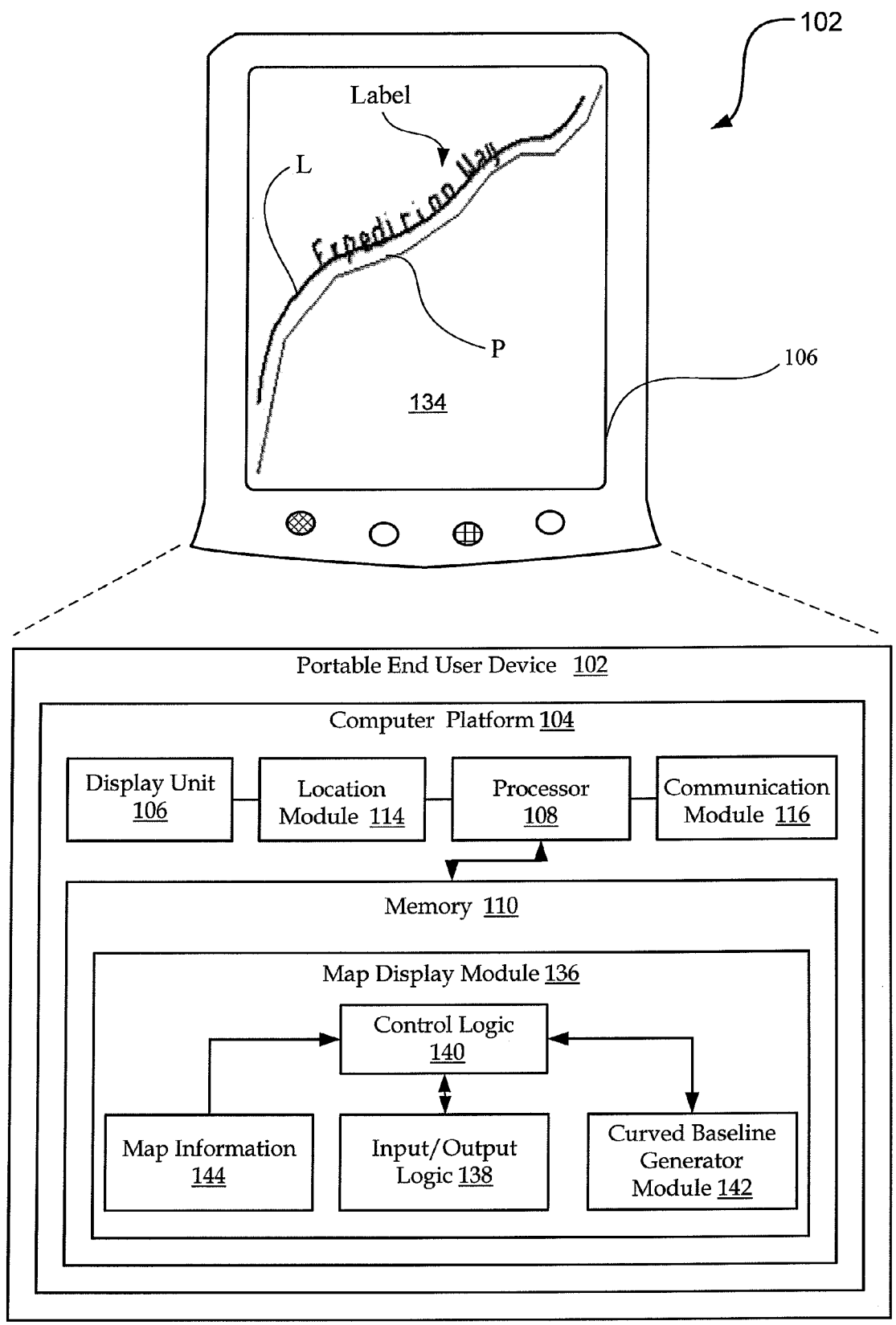
FIG. 2 is a block diagram of an exemplary embodiment of a portable end user device using a method of generating a curved baseline for map labeling.

The portable end user device 102 illustrated in FIG. 1, and provided in greater detail in FIG. 2, is embodied in a hand held computing device. In other embodiments, the end user device 102 is integral to, or removable mounted to, a vehicle such as an automobile (not shown).

Non-limiting, the portable end user device 102 may comprise a computer platform 104 operable to determine and display a position of the portable end user device 102 and display its position on an output display 106 integrally or remotely connected to the device 102. The map information displayed on the output display 106 is based upon map information 144 stored on internal/external memory devices 110, such as a compact disk (CD) and a secure digital (SD) product. Alternatively, map information may be is downloaded from a remote computing system 126. Still further, map information may be obtained from a desktop or notebook computer maintained by the user that may communicate with the end user device 102 over a communication link that includes a hardwired connection or wireless connection, using such technologies as BLUETOOTH and infra-red (IR) radio transmissions.

As illustrated in FIG. 2, a polyline P is drawn on display 106 to represent an object, for example, a road. Furthermore, associated with polyline P, a curved baseline L is generated, but not drawn, at a predetermined distance from the polyline P, on which a curved label, for example, "Expedition Way," is drawn. Curved labels provide a more cognitive approach for labeling map polylines because the shape of curved labels can be drawn more faithful to the original polylines.

In some aspects, computer platform 104 includes a processor 108 for controlling the operation of the device 102. Processor 108 may comprise an application-specific integrated circuit (ASIC), or other chipset, processor, microprocessor, logic circuit, or other data processing device operable to perform one or more processing functions for the end user device 102. Furthermore, processor 108 may include various processing subsystems, embodied in hardware, firmware, software, and combinations thereof, that enable the functionality of the end user device 102.

In some aspects, computer platform 104 includes a location module 114 that comprises, in whole or in part, a geographic information system (GIS), such as a tool used to gather, transform, manipulate, analyze, and produce information related to the surface of the earth. In some aspects, such a GIS may include a global positioning system (GPS), such as a satellite navigational system formed by satellites 132, orbiting the earth and their corresponding receivers on the earth. The GPS satellites continuously transmit digital radio signals that contain data on the satellites' location and the exact time to the earth-bound receiver. The satellites are equipped with atomic clocks that are precise, for example, to within a billionth of a second.

The computer platform 104 of portable end user device 102 further includes a communication module 116 operable to transfer data between components of the portable end user device 102 and between the portable end user device 102 and external devices, such as GPS satellite 132 and remote computer system 120.

For instance, communication module 116 may include one or any combination of input and/or output ports, transmit and receive chain components, transceivers, antenna, etc, i.e., a wired or wireless universal serial bus (USB) port. Communication module 116 may include, but is not limited to, technologies such as a one or any combination of a wireless GPS satellite interface; a serial port, i.e., a universal serial bus (USB) port and a FIREWIRE serial bus interface; an infrared interface; and a short range radio frequency interface, such as a BLUETOOTH technology interface.

Memory 110 includes any type of memory, including read-only memory (ROM), random-access memory (RAM), EPROM, EEPROM, flash memory cells, secondary or tertiary storage devices, such as magnetic media, optical media, tape, or soft or hard disk, whether resident on computer platform 102 or remote therefrom. Processor 108 is operable to execute programs stored in memory 110, including a map display module 136 that includes program instructions to receive inputs from location module 114 and display the position of portable end user device 102 on display unit 106 along with memory resident map information 144 stored on device 102 or downloaded from remote server 120.

Map display module 136 also includes control logic 140 operable to manage the operation of map display module 136 and, based upon commands from input/output logic 138, retrieve and store map information 144 on portable end user device 102 or on another device not shown.

Under control of processor 108, position information retrieved from satellites 132, as well as portions of map information 144, is processed and data is transmitted to display unit 106, to display the location of device 102 on a varying background of highways, roads, bridges, and rivers.

Still referring to FIG. 2, based upon map information 144, control logic 140 transmits a polyline P, comprising points $\{p_1, p_2, \ldots, p_n\}$, to a curved baseline generator module 142. Curved baseline generator module 142 computes curved baseline L and transmits discrete points making up curved baseline L to control logic 140. Control logic 140 then operates to draw an appropriate curved label on display unit 106 using the curved baseline L. In some embodiments, curved baseline generator module 142 generates curved baseline L above, or left of polyline P, as shown in FIG. 2. Non-limiting, the position of the curved baseline L relative to the polyline P is predetermined.

Depending upon the specific portable end user device 102, and more specifically, the available computing power within the portable device 102, curved baseline generating module 142 is located in the portable end user device 102 or alternatively, in a remote device in communication with portable device 102.

Figure 3:
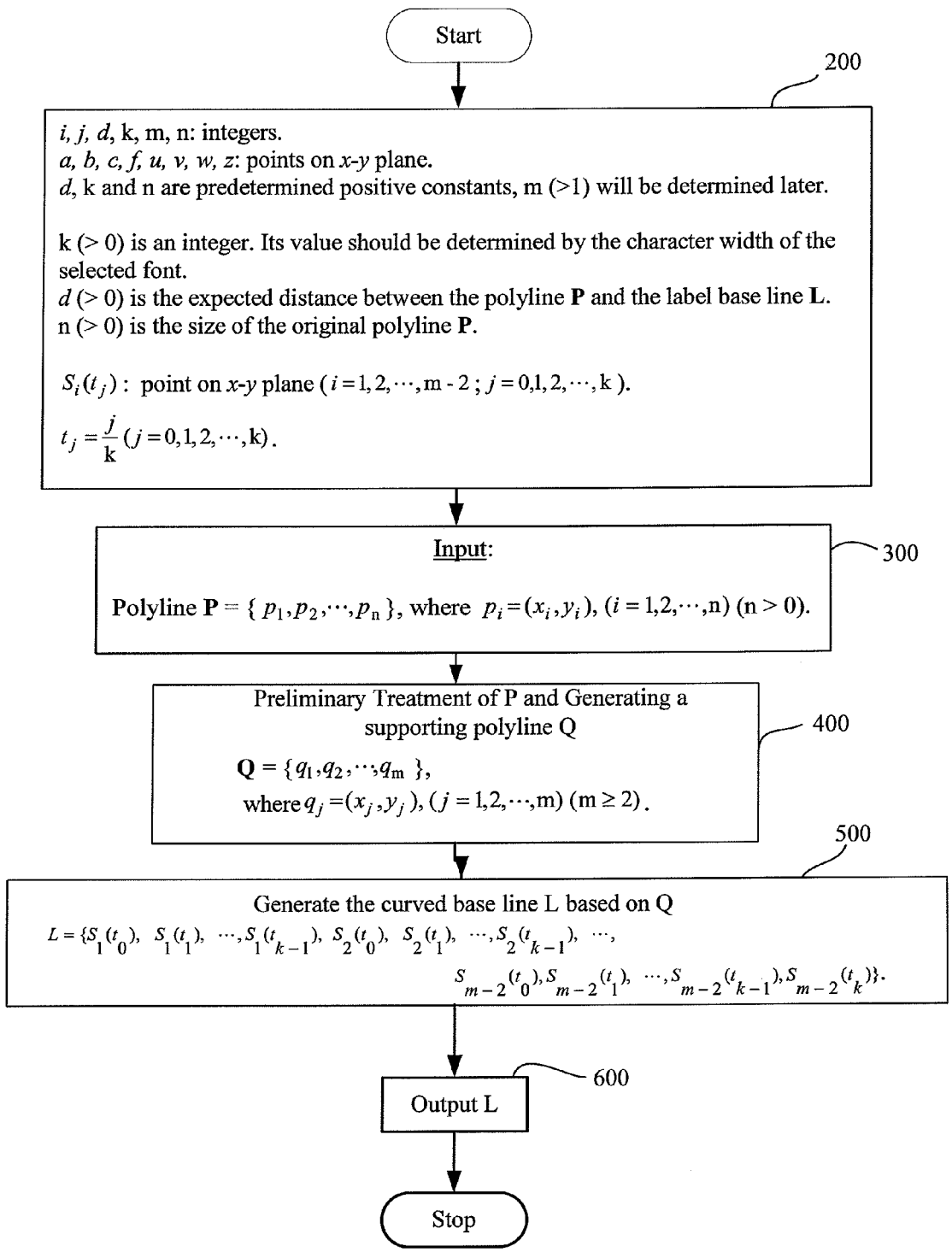
FIG. 3 is a flowchart of one embodiment of method of generating a curved baseline for map labeling, according to the device of FIG. 2.

FIG. 3 is a high-level embodiment of a method implemented by curved baseline generation module 142 to generate curved baseline L that is above and does not touch polyline P. At step 200 the curved baseline generating module 142 initializes indexes used throughout the process. At step 300, a polyline P is input to curved baseline generator module 142 executing on the portable end user device 102 or a connected device.

Curved baseline generator module 142 is operable to generate, above and not touching polyline P, curved baseline L upon which a curved label is drawn. At step 400, a supporting polyline Q is generated based upon polyline P. At step 500, curved baseline L is generated based upon polyline Q. At step 600, curved baseline generator module 142 outputs discrete points along curved baseline L upon which map display module 110 displays a curved map label above and the left of polyline P.

Definitions

In one aspect, curved baseline generating module 136 is operable to generate a curved baseline L based upon a polyline $P=\{p_1,p_2,\ldots,p_n\}$ with a plurality of points $p_i=(x_i,y_i)$, $(i=1,2,\ldots,n)$ input at step 300. Polyline P is defined as a polyline having n points. In one aspect, points $x_i \leq x_{i+1}$ ($i=1$, 2, ..., n−1) and polyline P is directed from $p_1$ to $p_n$ and the labels are placed on the upper side, i.e., the left side, of the polyline P without touch it.

Each point $p_i$ ($i=1,2,\ldots,n$) includes a turning property that, in one embodiment, is defined as follows, based upon the geometric drawings of FIGS. 5 and 6:

i) The first point $p_1$ and the last point $p_n$ are both defined as left-turning points.

ii) For $i=2,3,\ldots,n-1$, $p_i$ is said to be a right-turning point if the point $p_{i+1}$ lies to the right of the directed line through $p_{i-1}$ and $p_i$ (FIG. 5). Otherwise, $p_i$ is said to be a left-turning point (FIG. 6).

Preliminary Treatment

Preliminary treatment of polyline P is performed by modifying the individual points $p_i$ making up the polyline P. At FIG. 4, step 404, a determination is made whether i is within the range $1<i<n$. If true, control passes to step 406, which further determines if $p_i$ is a left-turning point. If $p_i$ is a left-turning point, at step 408 the program determines if the angle $\angle p_{i-1}p_ip_{i+1}$ is less than 135 degrees. If true, the point $p_i$ is replaced by $p'_i$ at step 410.

FIG. 7 illustrates an exemplary situation wherein point $p'_i$ is calculated by letting m be the midpoint of $\overline{p_{i-1}p_{i+1}}$ and determining a point c that satisfies a condition wherein $\overline{p_{i-1}p_{i+1}} \perp \overline{cm}$ and $|\overline{cm}|=|\overline{p_{i-1}m}|=|\overline{mp_{i+1}}\times|$. Point $p'_i$ is the intersection of the circle Cp centered at c with radius $|\overline{cp_{i-1}}|$ and the line connecting c and $p_i$. As shown in FIG. 7, the resultant segments $|\overline{p'_ic}|=|\overline{p_{i-1}c}|=|\overline{p_{i+1}c}|$ and $\angle p_{i-1}p_ip'_{i+1}=135°$. For convenience, $p'_i$ is henceforth labeled $p_i$.

Figure 4:
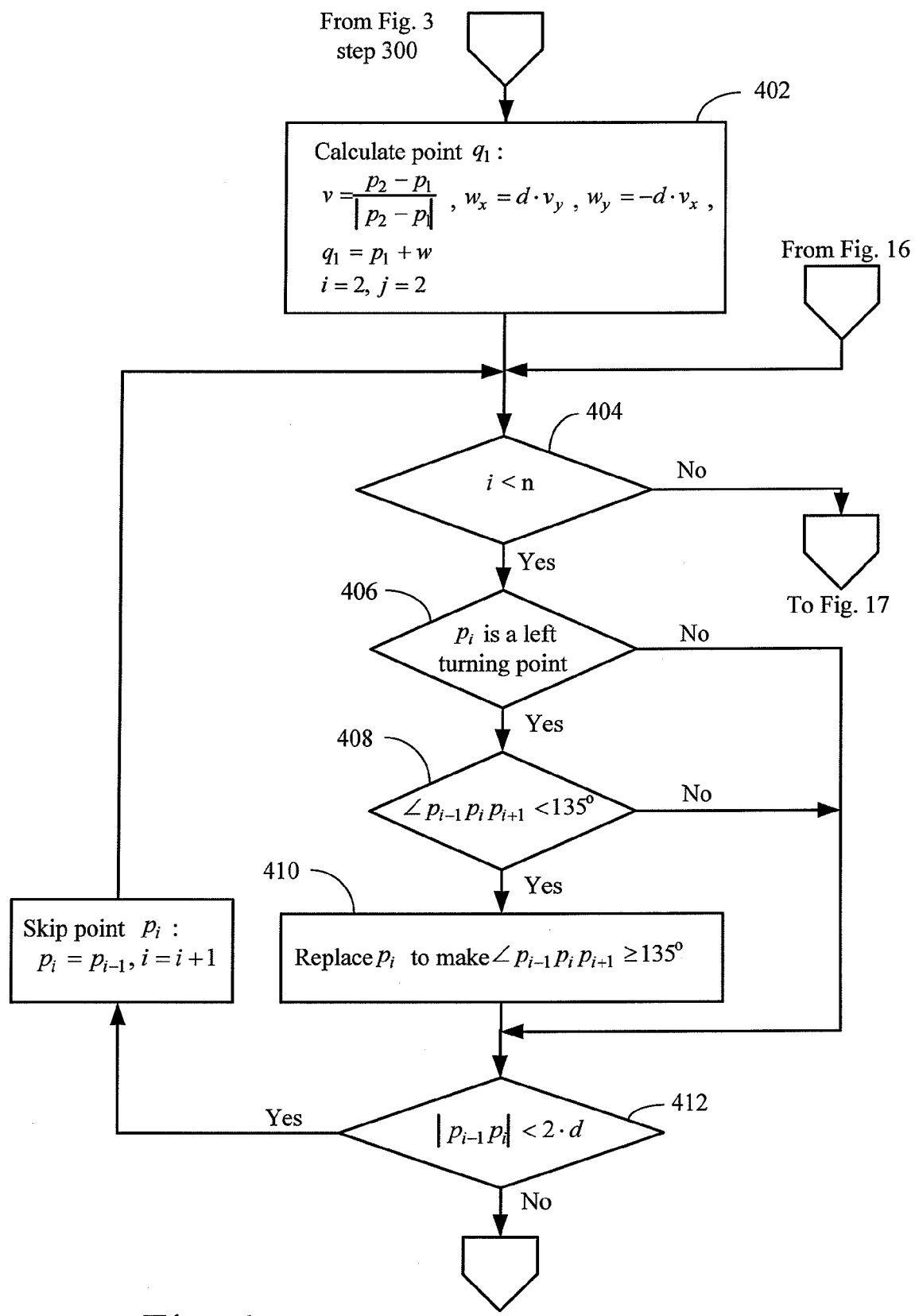
FIG. 4 illustrates a more detailed flowchart generating the first point of supporting set Q and performing preliminary treatment for an $i^{th}$ point of Polyline P, where $P=\{p_1, p_2, \ldots, p_{n-1}\}$.

At FIG. 4, step 412, a determination is made as to whether point $p_{i+1}$ may be ignored and is based upon a distance d defined at FIG. 3 step 200. Distance d, where $d>0$, is the expected distance between P and a curved base line L to be determined. If some segment, e.g., $\overline{p_ip_{i+1}}$ ($1 \leq i < n-1$), is shorter than 2d, point $p_{i+1}$ may be ignored.

Building the Set of Supporting Points Q

The preliminary treatment disclosed above generates a polyline P, wherein $P=\{p_1,p_2,\ldots,p_n\}$. Supporting set $Q=\{q_1, q_2, \ldots, q_m\}$ ($m \geq n$), which is also a polyline, is also built according to distance d.

Referring to the geometric drawing of FIG. 8 and step 402 of FIG. 4, $q_1$, the first point of Q, is calculated as follows:

$$\text{Let } u = \frac{p_2 - p_1}{|p_2 - p_1|}$$

and let vector $w_x = d \cdot u_y$, $w_y = -d \cdot u_x$.

Then, $q_1 = p_1 + w$.

Figure 8:
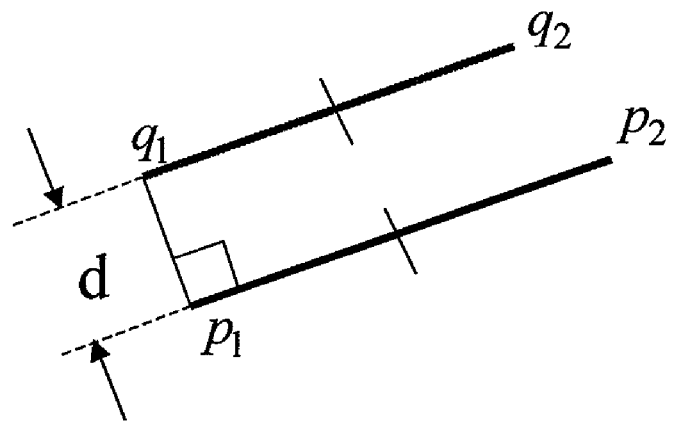
FIG. 8 is a geometric diagram of the first point of supporting set Q.

Point $q_1$ of FIG. 8 satisfies the following three conditions:

i) $\overline{q_1p_1} \perp \overline{p_1p_2}$ (The line passing through the point $q_1$ and $p_1$ is perpendicular to the line passing through the point $p_1$ and $p_2$).

ii) $|\overline{q_1p_1}|=d$ (The distance between $q_1$ and $p_1$ is equal to d).

iii) The point $q_1$ is on the left side of the vector from $p_1$ to $p_2$.

Figure 9:
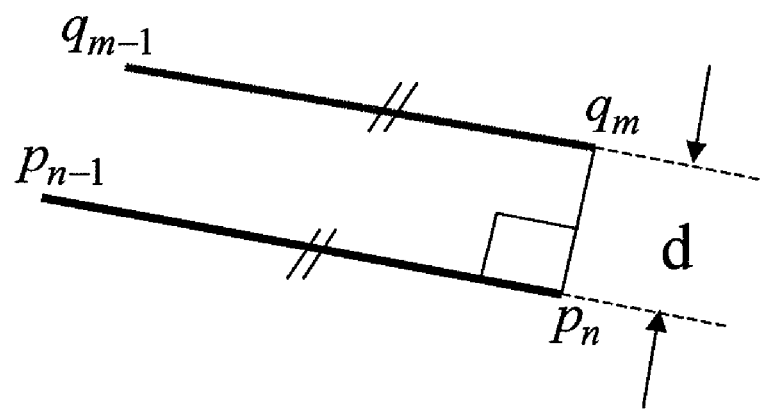
FIG. 9 is a geometric diagram of the last point of supporting set Q.

Referring to FIG. 9 and the flowcharts of FIGS. 10 and 11, $q_m$, the last point of Q, is calculated as follows:

Let $$v = \frac{p_n - p_{n-1}}{|p_n - p_{n-1}|}$$

and let vector z be calculated as follows.

$$z_x = d \cdot v_y, \; z_y = -d \cdot v_x$$

Then, calculate $q_m = p_n + Z$, wherein point $q_m$ satisfies the following three conditions.
  i) $\overline{q_m p_n} \perp \overline{p_{n-1} p_n}$ (The line passing through the point $q_m$ and $p_n$ is perpendicular to the line passing through the point $p_{n-1}$ and $p_n$).
  ii) $\overline{q_m p_n} = d$ (The distance between $q_m$ and $p_n$ is equal to d).
  iii) The point $q_m$ is on the left side of the vector from $p_{n-1}$ to $p_n$.

Figure 10:
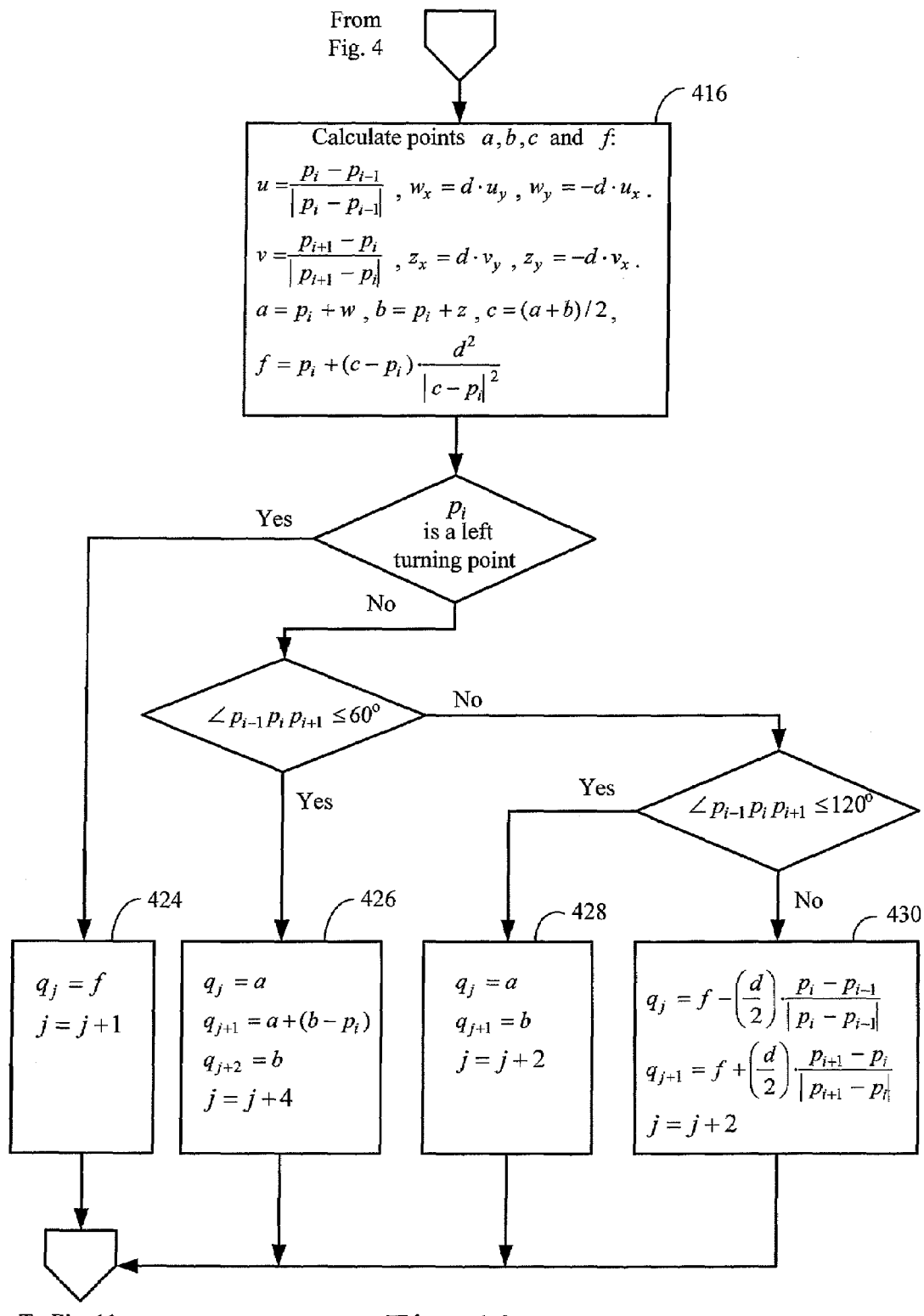
FIGS. 10 and 11 illustrate an exemplary method of generating the points between the first and last points of supporting set Q.
Figure 11:
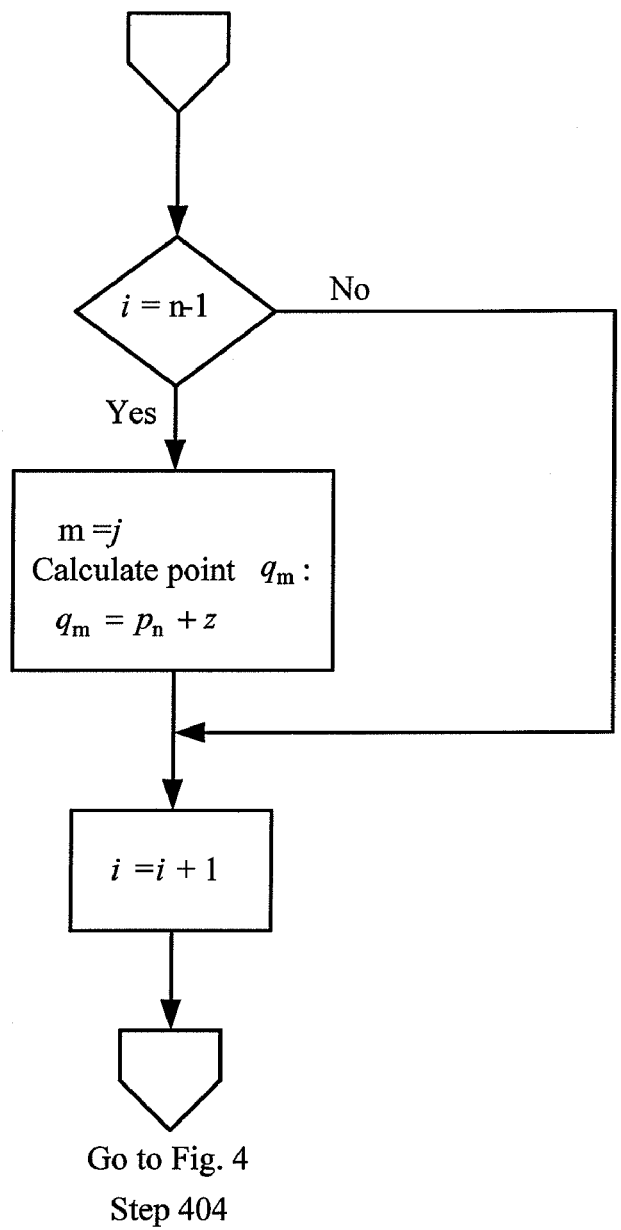

Referring to the flowcharts illustrated in FIGS. 10 and 11, $q_m$, the $2^{nd}$ to $(m-1)^{th}$ point of Q, is calculated wherein for $1 < i <= n-1$, assume points $q_1, q_2, \ldots, q_{j-1}$ ($1 < j < m$) have been generated corresponding to points $p_1, p_2, \ldots, p_{i-1}$ ($1 < i < n$). Consider two lines, $l_1$ and $l_2$, that satisfy the following two conditions:
  i) $l_1$ is to the left or above the segment $p_{i-1} p_i$ and parallel to the segment $p_{i-1} p_i$. The distance between $l_1$ and the segment $p_{i-1} p_i$ is equal to d, and
  ii) $l_2$ is to the left or above the segment $p_i p_{i+1}$ and parallel to the segment $p_i p_{i+1}$. The distance between $l_2$ and the segment $p_i p_{i+1}$ is equal to d.

Referring to step 416 of FIG. 10, the position f, the intersection of $l_1$ and $l_2$ is determined as follows.

Letting $$u = \frac{p_i - p_{i-1}}{|p_i - p_{i-1}|} \text{ and } v = \frac{p_{i+1} - p_i}{|p_{i+1} - p_i|}$$

calculate vector w and z according to:

$$w_x = d \cdot u_y, \; w_y = -d \cdot u_x; \text{ and}$$

$$z_x = d \cdot v_y, \; z_y = -d \cdot v_x.$$

Then, letting point $a = p_i + w$ and point $b = p_i + z$ calculate point $c = (a+b)/2$. The intersection f of $l_1$ and $l_2$ can be calculated by:

$$f = p_i + (c - p_i) \cdot \frac{d^2}{|c - p_i|^2}.$$

Figure 12:
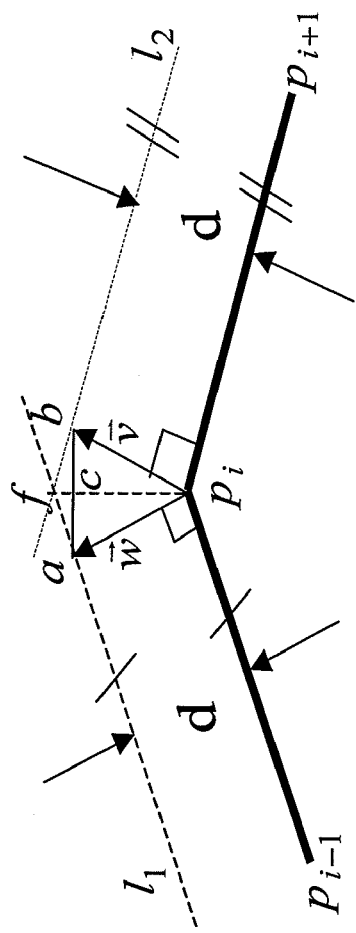
FIG. 12 is a geometric drawing illustrating finding a position f, the intersection of $l_1$ and $l_2$ wherein point $p_i$ is a right-turning point.
Figure 13:
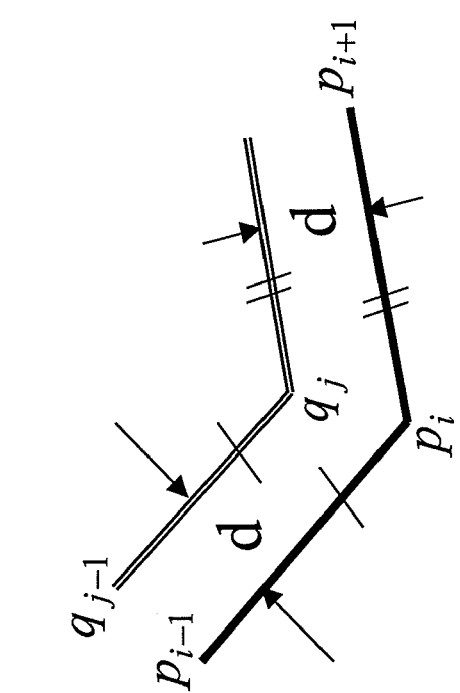
FIG. 13 is a geometric drawing generating a point $q_j$ to add to Q when point $p_i$ is a left-turning point.

The diagram of FIG. 12 and step 424 of FIG. 10 shows the determination of point f in the case wherein point $p_i$ is a right-turning point (the calculations are the same if $p_i$ is a left-turning point). If point $p_i$ ($0 < i < n$) is a left-turning point (FIG. 13), one point $q_j = f$ will be added to Q.

Figure 14:
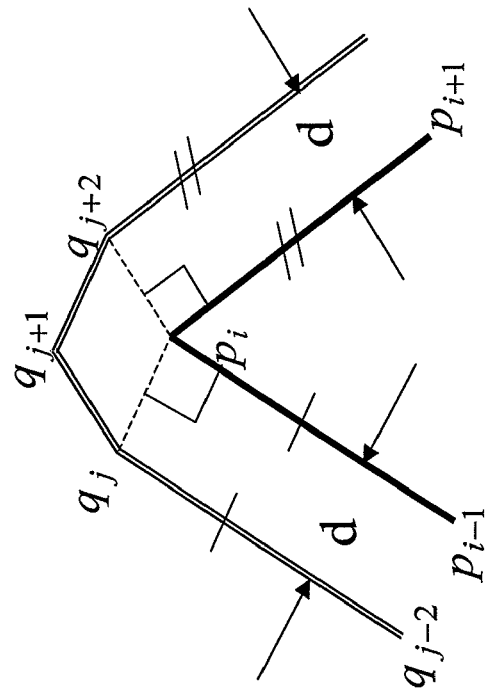
FIG. 14 is a geometric generating points $q_j$, $q_{j+1}$, and $q_{j+2}$, to add to Q when point $p_i$ is a right-turning point and $\angle p_{i-1}p_ip_{i+1} \leq 60°$.
Figure 15:
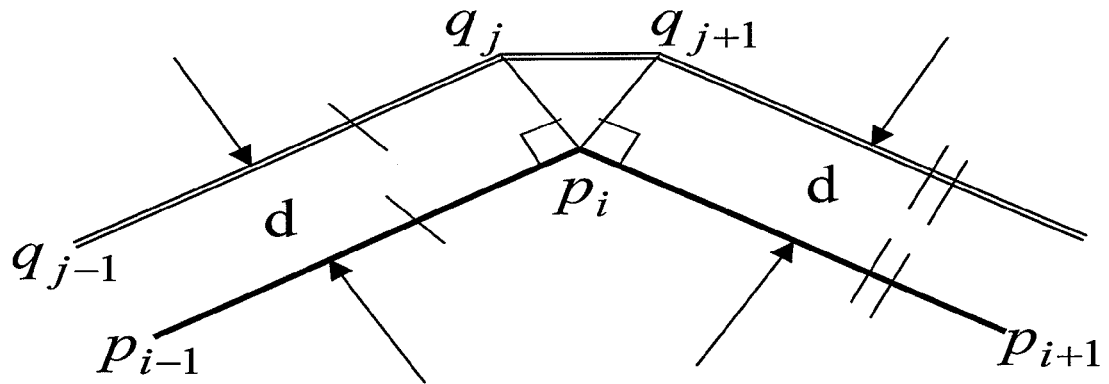
FIG. 15 a geometric drawing generating two points, $q_j$ and $q_{j+1}$, to add to Q when point $p_i$ is a right-turning point and $60° \angle p_{i-1}p_ip_{i+1} \leq 120°$.
Figure 16:
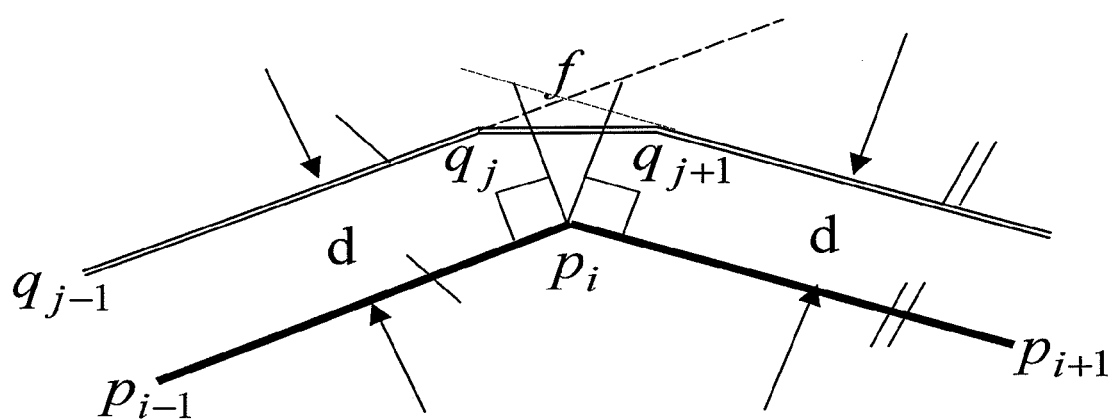
FIG. 16 a geometric drawing generating two points, $q_j$ and $q_{j+1}$, to add to Q when point $p_i$ is a right-turning point and $\angle p_{i-1}p_ip_{i+1} > 120°$.

If point $p_i$ ($0 < i < n$) is a right-turning point, there are the following three cases, as illustrated in FIGS. 14-16:
  i) If $\angle p_{i-1} p_i p_{i+1} \leq 60°$, i.e., FIG. 14, three points, q, $q_{j+1}$, and $q_{j+2}$ will be added to Q as shown in step 426 of FIG. 11. Referring back to FIG. 13, q=a, $q_{j+1} = a + (b - p_i)$, and $q_{j+2} = b$.
  ii) If $60° \angle p_{i-1} p_i p_{i+1} \leq 120°$, i.e., FIG. 15, two points, q and $q_{j+1}$ are added at step 428, wherein $q_j = a$ and $q_{j+1} = b$.
  iii) If $\angle p_{i-1} p_i p_{i+1} > 120°$, i.e., FIG. 16, two points $q_j$ and $q_{j+1}$ will be added to Q. In this case, they are calculated as:

$$q_j = f - \left(\frac{d}{2}\right) \cdot \frac{p_i - p_{i-1}}{|p_i - p_{i-1}|}$$

and $$q_{j+1} = f + \left(\frac{d}{2}\right) \cdot \frac{p_{i+1} - p_i}{|p_{i+1} - p_i|}$$

(FIG. 10, step 430);
  wherein the segment $\overline{q_j q_{j+1}}$ satisfies:

$$|q_j q_{j+1}| \geq d \cdot \frac{\sqrt{3}}{2}.$$

Based upon steps described above, polyline $Q = \{q_1, q_2, \ldots, q_m\}$ ($m \geq n$) include the following properties.

1) Q is above the original line polyline P and does not touch P.

2) Each triangle $\Delta q_u q_{u+1} q_{u+2}$ ($u = 1, 2, \ldots, m-2$) in FIGS. 14-16 is above the original polyline P and does not touch P.

3) Because the operations required to build the supporting points Q are limited, the total run time to generate Q is O(n), the time required to execute the above procedure for n points.

4) Q satisfies $$|\overline{q_j q_{j+1}}| \geq d \cdot \frac{\sqrt{3}}{2} (j = 1, 2, \ldots, m - 1).$$

Building the Curved Baseline by Generating B-Spline Points

Referring back to FIG. 3, step 500, the curved baseline L is then built by generating a predetermined number of B-Spline points with Q as the supporting set, and then connecting the points to form a curved baseline L. Literature generating of B-Spine points includes, for example, Fujio Yamaguchi, "Curves and Surfaces in Computer Aided Geometric Design", 1988, Springer-Verlag (pp 169-198 and pp 233-245), hereby incorporated herein in its entirety.

Figure 17:
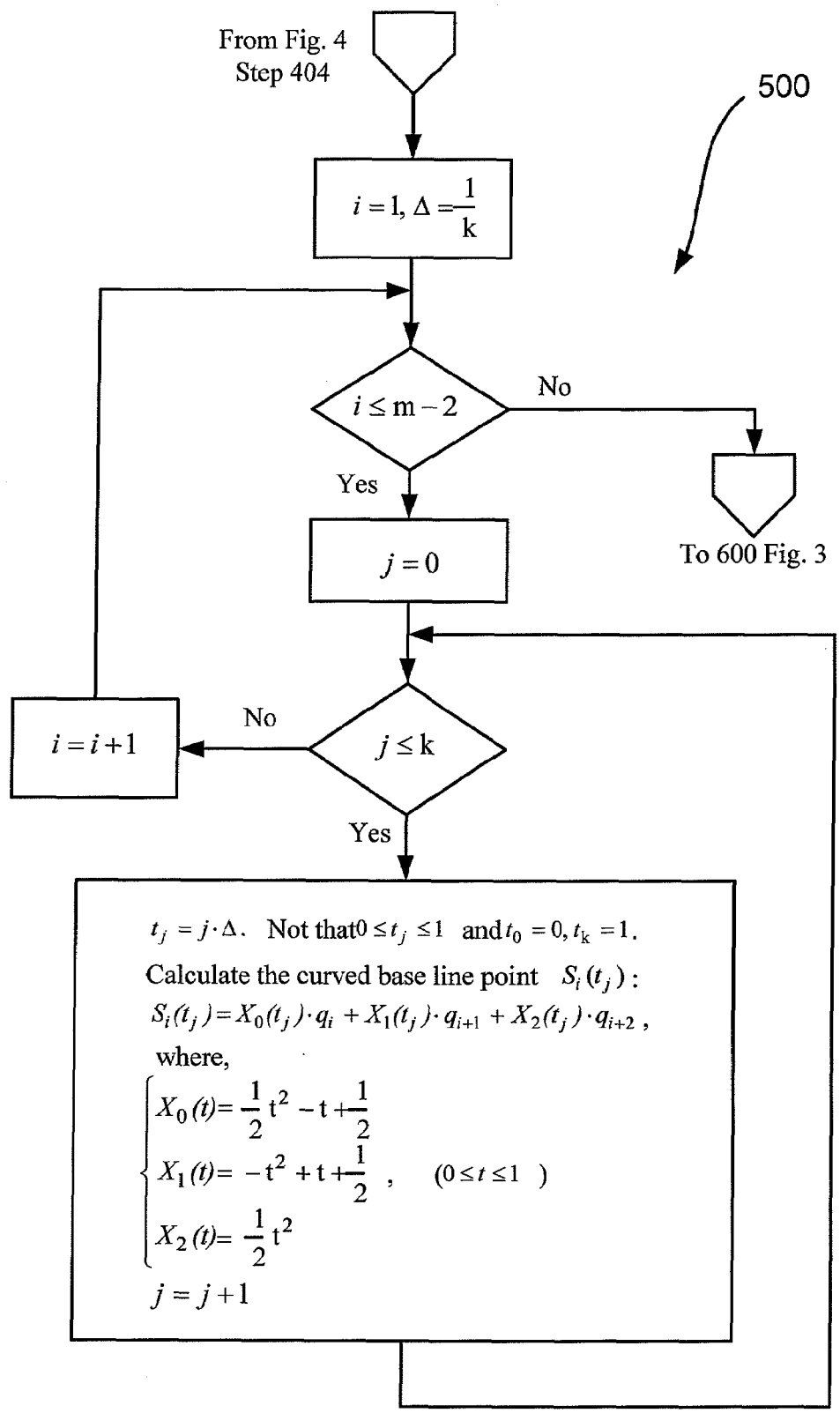
FIG. 17 illustrates an exemplary flowchart of a method of generating the discrete points comprising curved base line L.

FIG. 17 illustrates an exemplary flowchart detailing step 500 of FIG. 3. From the preliminary treatment section, $Q = \{q_1, q_2, \ldots, q_m\}$ ($m \geq n$), where n is the total number of points of the original polyline P. In one embodiment, a third order B-Spline curve and of degree 2 is defined as:

$$S(t) = \sum_{i=1}^{m-2} S_i(t), \; (0 \leq t \leq 1), \qquad \text{(I)}$$

where $$S_i(t) = X_0(t) q_i + X_1(t) q_{i+1} + X_2(t) q_{i+2} \qquad \text{(II)}$$
$$(i = 1, 2, \ldots, m - 2)$$

and

-continued $$\begin{cases} X_0(t) = \frac{1}{2}t^2 - t + \frac{1}{2} \\ X_1(t) = -t^2 + t + \frac{1}{2} \\ X_2(t) = \frac{1}{2}t^2 \end{cases} \quad \text{(III)}$$

Choosing a constant k>1, let $$\Delta = \frac{1}{k}$$

and $t_v = v \cdot \Delta$ (v=0,1,2, . . . ,k).

Calculate $S_i(t_j)$ (i=1,2, . . . ,m−2 and j=0,1,2, . . . ,k).

Connecting these points in order generates the following polyline:

$$L = \{S_1(t_0), S_1(t_1), \ldots, S_1(t_{k-1}), S_2(t_0), S_2(t_1), \ldots, S_2(t_{k-1}), \ldots, S_{m-2}(t_0), S_{m-2}(t_1), \ldots, S_{m-2}(t_{k-1}), S_{m-2}(t_k)\}.$$

Since $S_1(t_k) = S_2(t_0)$, $S_2(t_k) = S_3(t_0)$, . . . , $S_{m-3}(t_k) = S_{m-2}(t_0)$, there's no need to keep both $S_i(t_k)$ and $S_{i+1}(t_0)$ if $1 \leq i \leq m-3$. Only when i=m−2, the last point $S_{m-2}(t_k)$ is needed.

Once polyline L is generated, it is used to draw a curved label. According to a property of B-Spline generated points, polyline L has following three properties:

1. L is above the original polyline P and does not touch it because each sub curve $L_i\{S_i(t_0), S_i(t_1), \ldots, S_i(t_k)\}$ is totally contained in the triangle $\Delta q_i q_{i+1} q_{i+2}$ (i=1,2, . . . , m−2), based upon the teachings of Fujio Yamaguchi, as previously disclosed.

2. L is "continuous" for two reasons:
   i. $S_i$ is a polynomial of degree 2 on [0, 1] (i=1, 2, . . . , m−2), and
   ii. $S_i(t_k) = S_{i+1}(t_0)$ or $S_i(1) = S_{i+1}(0)$ (i=1, 2, . . . , m−3).

2. L is "smooth" because the derivatives of function S, that is S', are continuous, i.e.:
   i) The derivatives $S'_i$ is a polynomial of degree 1 on [0,1] (i=1,2, . . . ,m−2); and
   ii) $S'_i(t_k) = S'_{i+1}(t_0)$ or $S'_i(1) = S'_{i+1}(0)$ (i=1,2, . . . ,m−3).

Following is an analysis of the performance of the method heretofore disclosed.

For a fixed t ($0 \leq t \leq 1$), from equation III, the number of multiplications for calculating $X_i(t)$ (i=0,1,2) is a constant, for example $C_1$. Then, the number of multiplications for calculating one point $S_u(t_v)$ for a fixed u and fixed v ($1 \leq u \leq m-2$; $0 \leq v \leq k-1$) is $3C_1$. The total number of multiplications for calculating k points $S_u(t_0), S_u(t_1), \ldots, S_u(t_{k-1})$ for a fixed u ($1 \leq u \leq m-2$) is 3 $kC_1$. Therefore, the total number of multiplications for generating L is $3(m-2)kC_1 + 3C_1 = 3((m-2)k+1)C_1 \leq 3mkC_1$. The extra $3C_1$ is for the last point $S_{m-2}(t_k)$.

The total number of points of Q is no more than 3n, where n is the number of points of the original polyline, i.e., $m \leq 3n$. Therefore, the total number of multiplications for calculating (m−2)k+1 points of L is no more than $9C_1 kn$. Because both $C_1$ and k are constants, the run time for generating L s O(n).

The preliminary treatment and the supporting set build runs in O(n) time. Accordingly, the over all run time of the algorithm is O(n).

While the foregoing disclosure shows illustrative aspects and/or aspects, it should be noted that various changes and modifications could be made herein without departing from the scope of the described aspects and/or aspects as defined by the appended claims. Furthermore, although elements of the described aspects s described or claimed in the singular, the plural is contemplated unless limitation to the singular is explicitly stated. Additionally, all or a portion of any aspect and/or aspects may be utilized with all or a portion of any other aspect and/or aspect, unless stated otherwise.

What is claimed is:

1. A computer-implemented method of generating a curved baseline for a map labeling, comprising:
   receiving by a computing device a polyline P of n points, where $P = \{p_1, p_2, \ldots, p_n\}$;
   generating with the computing device a supporting polyline Q of m points an expected distance d between P curved base line L, where $Q = \{q_1, q_2, \ldots, q_m\}$ ($m \geq n$);
   generating with the computing device a predetermined number of B-Spline points based upon supporting polyline Q; and
   outputting with the computing device the generated B-Spline points.

2. The method of claim 1, wherein said generating supporting polyline Q further comprises:
   generating points $\{q_1, q_2, \ldots, q_m\}$ such that each triangle $\Delta q_u q_{u+1} q_{u+2}$ (u=1, 2, . . . ,m−2) is above polyline P and does not touch P.

3. The method of claim 1, wherein said generating supporting polyline Q further comprises:
   generating points $\{q_1, q_2, \ldots, q_m\}$ such that Q satisfies $$|\overline{q_j q_{j+1}}| \geq d \cdot \frac{\sqrt{3}}{2} (j = 1, 2, \ldots, m-1).$$

4. The method of claim 2, wherein said generating supporting polyline Q further comprises:
   generating first point $q_1$, wherein:

$$u = \frac{p_2 - p_1}{|p_2 - p_1|};$$

vectors $w_x = d \cdot u_y$; $w_y = -d \cdot u_x$; and $q_1 = p_1 + w$.

5. The method of claim 4, wherein said generating supporting polyline Q further comprises:
   generating last point $q_m$, wherein:

$$v = \frac{p_n - p_{n-1}}{|p_n - p_{n-1}|};$$

vectors $z_x = d \cdot v_y$, $z_y = -d \cdot v_x$; and $q_m = p_n + z$.

6. The method of claim 1, further comprising connecting the B-Spline points to form a curved baseline L.

7. The method of claim 6, further comprising using curved baseline L to draw a curved label.

8. At least one processor configured to perform the actions of:
   receiving a polyline P of n points, where $P = \{p_1, p_2, \ldots, p_n\}$;
   generating a supporting polyline Q of m points an expected distance d between P and a curved base line L, where $Q = \{q_1, q_2, \ldots, q_m\}$ ($m \geq n$);
   generating a predetermined number of B-Spline points based upon supporting polyline Q.

9. A computer-readable medium storing instructions, the instructions causing a computer to perform a method, the method comprising:
   receiving a polyline P of n points, where $P=\{p_1, p_2, \ldots, p_n\}$;
   generating a supporting polyline Q of m points at an expected distance d between P and a curved base line L, where $Q=\{q_1, q_2, \ldots, q_m\} (m \geq n)$;
   generating a predetermined number of B-Spline points based upon supporting polyline Q; and
   connecting the B-Spline points in sequence.

10. A portable end user device operable to generate a curved baseline for map labeling, comprising a computer platform further including:
   a processor;
   a memory executable by the processor, the memory including a curved baseline generator module that includes:
      an input of a polyline P of n points, where $P=\{p_1, p_2, \ldots, p_n\}$;
      logic operable to generate a supporting polyline Q of m points at an expected distance d between P and a curved base line L, where $Q=\{q_1, q_2, \ldots, q_m\} (m \geq n)$;
      logic operable to generate a predetermined number of B-Spline points based upon the generated supporting polyline Q; and
      an output comprising the B-Spline points forming the curved baseline L.

11. The device of claim 10, wherein the portable end user device is a portable GPS device.

12. The device of claim 10, further comprising a display unit operable to display a label drawn on the curved baseline L.

* * * * *